US011093239B1

(12) United States Patent
Kappen et al.

(10) Patent No.: US 11,093,239 B1
(45) Date of Patent: Aug. 17, 2021

(54) APPLICATION DRIVEN CONFIGURATION OF SERVICE MANAGEMENT TOOLS

(71) Applicant: INTERNATIONAL BUSINESS MACHINES CORPORATION, Armonk, NY (US)

(72) Inventors: Bijo Sebastian Kappen, Bangalore (IN); Deepak Poola Chandrashekar, Bangalore (IN); Saiprasad Kolluri Venkata Sesha, Bangalore (IN); Manojit Das, Bangalore (IN); Rajesh Garg, Bangalore (IN); Pranay Sanghvi, Indore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/930,653

(22) Filed: May 13, 2020

(51) Int. Cl.
*G06F 9/44* (2018.01)
*G06F 9/50* (2006.01)
(Continued)

(52) U.S. Cl.
CPC .................. *G06F 8/71* (2013.01); *G06F 8/60* (2013.01); *G06F 11/302* (2013.01);
(Continued)

(58) Field of Classification Search
CPC ..... G06F 8/71; G06F 8/60; G06F 8/63; G06F 8/24; G06F 16/245; G06F 11/302;
(Continued)

(56) References Cited

U.S. PATENT DOCUMENTS

| 7,167,550 B2 * | 1/2007 | Klos .................. H04M 3/2263 379/201.01 |
| 7,272,730 B1 * | 9/2007 | Acquaviva ............ G06F 1/3203 713/300 |

(Continued)

FOREIGN PATENT DOCUMENTS

| CN | 101814084 A | 8/2010 |
| CN | 104267991 A | 1/2015 |

(Continued)

OTHER PUBLICATIONS

Fei Li et al., Towards Automated IoT Application Deployment by a Cloud-based Approach, 2013,IEEE [Retrieved on Apr. 19, 2021]. Retrieved from the internet: <URL: https://ieeexplore.IEEE.org/stamp/stamp.jsp?tp=&arnumber=6717286> 8 Pages (61-68) (Year: 2013).*

(Continued)

*Primary Examiner* — Anibal Rivera
(74) *Attorney, Agent, or Firm* — Schmeiser, Olsen & Watts; William H. Hartwell

(57) ABSTRACT

An approach is provided for configuring a service management (SM) tool. During an application deployment, a service registry receives a query from a tier of the application for a list of SM tools that provide a SM function. The service registry sends the list of SM tools to the application. Using an application programming interface (API) in an integration layer, (i) a user-selected SM tool included in the list of SM tools, (ii) a business criticality of the tier of the application, and (iii) parameters specifying the SM function are received. Using the API and based on the business criticality of the tier of the application, the selected SM tool is configured with the parameters specifying the SM function.

20 Claims, 5 Drawing Sheets

(51) Int. Cl.
| | |
|---|---|
| *G06F 8/71* | (2018.01) |
| *G06Q 10/06* | (2012.01) |
| *G06Q 10/10* | (2012.01) |
| *G06F 8/60* | (2018.01) |
| *G06F 11/30* | (2006.01) |
| *G06F 11/34* | (2006.01) |
| *G06F 16/245* | (2019.01) |
| *G06F 8/61* | (2018.01) |
| *G06F 8/20* | (2018.01) |

(52) U.S. Cl.
CPC ........ *G06F 11/3495* (2013.01); *G06F 16/245* (2019.01); *G06Q 10/06315* (2013.01); *G06Q 10/10* (2013.01); *G06F 8/24* (2013.01); *G06F 8/63* (2013.01); *G06F 11/3006* (2013.01)

(58) Field of Classification Search
CPC ............. G06F 11/3495; G06F 11/3006; G06Q 10/06315; G06Q 10/10
See application file for complete search history.

(56) References Cited

U.S. PATENT DOCUMENTS

| | | | | |
|---|---|---|---|---|
| 7,409,569 | B2* | 8/2008 | Illowsky | G06F 8/63 713/323 |
| 8,255,281 | B2* | 8/2012 | Benson | G06Q 30/04 705/26.1 |
| 10,171,560 | B2* | 1/2019 | Durairajan | H04L 41/0226 |
| 2002/0147611 | A1 | 10/2002 | Greene | |
| 2011/0202932 | A1* | 8/2011 | Borghini | G06F 9/54 719/321 |
| 2014/0248852 | A1* | 9/2014 | Raleigh | H04L 47/22 455/407 |
| 2016/0094401 | A1* | 3/2016 | Anwar | G06F 11/3006 709/223 |
| 2017/0279971 | A1* | 9/2017 | Raleigh | H04M 15/852 |
| 2018/0054352 | A1* | 2/2018 | Chefalas | G06F 9/44505 |
| 2018/0321981 | A1* | 11/2018 | McCormick | H04L 5/0035 |

FOREIGN PATENT DOCUMENTS

| | | |
|---|---|---|
| KR | 100772999 B1 | 11/2007 |
| KR | 20130082788 A | 7/2013 |
| WO | 2006026673 A2 | 3/2006 |
| WO | 2014039892 A1 | 3/2014 |

OTHER PUBLICATIONS

Anonymous; System and Method to Provide Systems and Service Integration via Composition using Brokerage within a Hybrid Cloud Environment; IP.com; IPCOM000247217D; Aug. 17, 2016; 4 pages.

Li, Qing et al.; Applications integration in a hybrid cloud computing environment: modelling and platform; Enterprise Information Systems; Apr. 11, 2012; 36 pages.

Notification of Transmittal of the International Search Report and the Written Opinion of the International Searching Authority, or the Declaration; dated Jun. 23, 2021; International application No. PCT/CN2021/082519; 9 Pages.

* cited by examiner

APPLICATION DRIVEN CONFIGURATION OF SERVICE MANAGEMENT TOOLS

BACKGROUND

The present invention relates to managing software applications, and more particularly to configuring service management tools.

A variety of service management (SM) tools exist in known hybrid multi-cloud environments. The SM tools manage activities such as monitoring, patching, backup and restore, and Incident, Problem, Change (IPC) management. The SM tools can use agents or be agentless. To be operable, the SM tools require multiple parameters to be configured. For example, the backup activity requires backup policies (e.g., type, content, and frequency) to be configured. As another example, the monitoring activity includes the monitoring of parameters and those parameters need to be configured.

SUMMARY

In one embodiment, the present invention provides a computer-implemented method of configuring a service management tool. The method includes during a deployment of an application, receiving, by one or more processors, a query from a tier of the application for a list of service management (SM) tools that provide a SM function. The query is received by a service registry that provides a directory of SM tools that are available across an enterprise and a mapping of configuration requirements to respective tiers of applications. The method further includes in response to the query, determining, by the one or more processors and using the service registry, the list of SM tools that provide the SM function and sending the list of SM tools from the service registry to the application. The method further includes using an application programming interface (API) in an integration layer, receiving, by the one or more processors and from the tier of the application, (i) a user-selected SM tool included in the list of SM tools, (ii) a business criticality of the tier of the application, and (iii) parameters specifying the SM function, the API associating the parameters with the business criticality of the tier of the application. The method further includes using the API and based on the business criticality of the tier of the application, configuring, by the one or more processors, the selected SM tool with the parameters specifying the SM function.

In another embodiment, the present invention provides a computer program product for configuring a SM tool. The computer program product includes one or more computer readable storage media. Computer readable program code is collectively stored on the one or more computer readable storage media. The computer readable program code is executed by a central processing unit (CPU) of a computer system to cause the computer system to perform a method analogous to the method of configuring a SM tool discussed above.

In another embodiment, the present invention provides a computer system. The computer system includes a central processing unit (CPU), a memory coupled to the CPU, and one or more computer readable storage media coupled to the CPU. The one or more computer readable storage media collectively contain instructions that are executed by the CPU via the memory to implement a method of configuring a SM tool, which is analogous to the method of configuring a SM tool discussed above.

DETAILED DESCRIPTION

Overview

Figure 1:
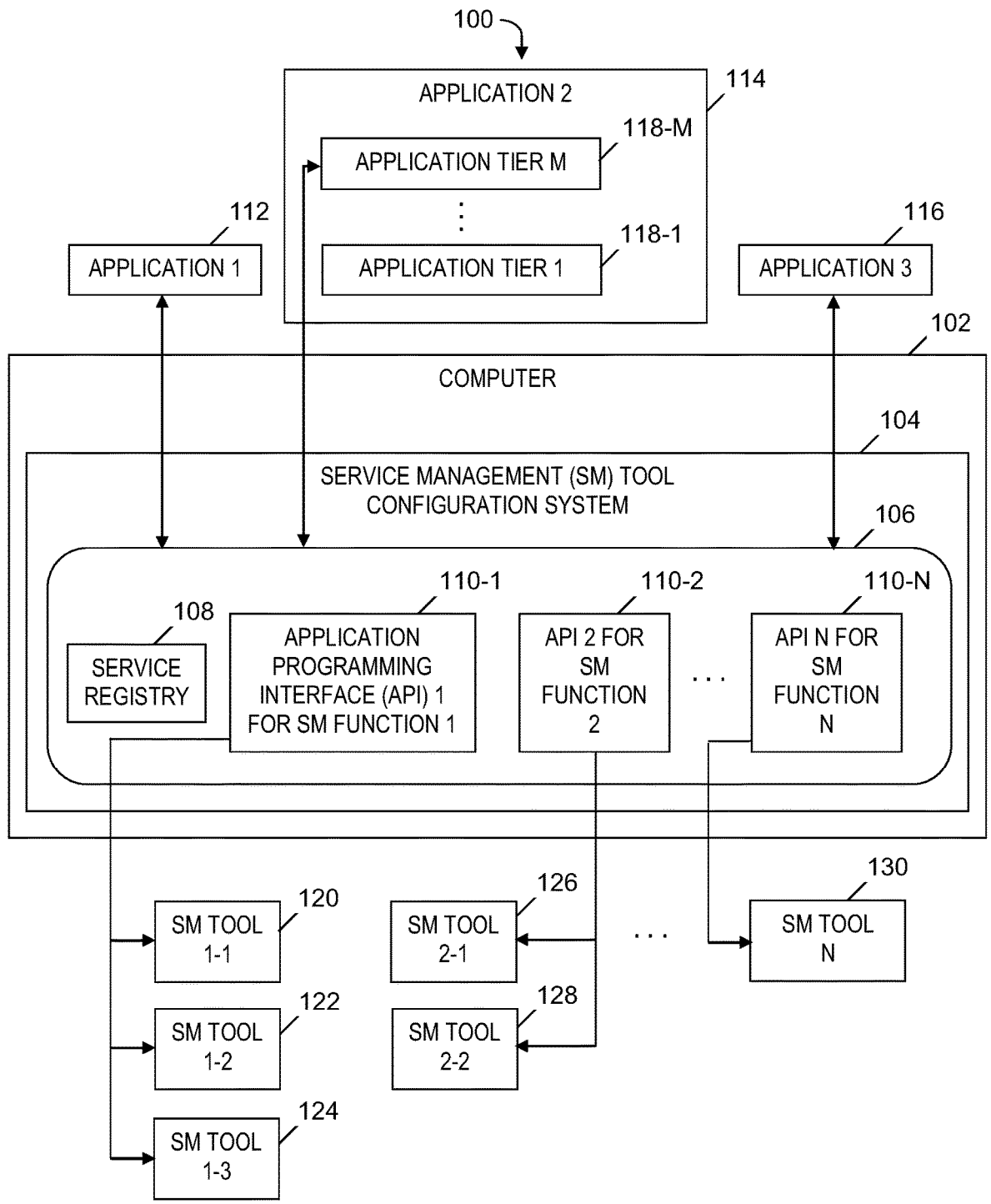
FIG. 1 is a block diagram of a system for configuring a service management tool, in accordance with embodiments of the present invention.

Known techniques to integrate an SM tool with a target application requires manual efforts of a human subject matter expert (SME) for the SM tool and one or more SMEs for the target application who are aware of the target application and its deployment configuration. A revision or redeployment of a target application requires time and effort of the tool and target application SMEs to perform the integration of the SM tool with the target application. For integrations of certain tools such as an SM tool for monitoring, a monitoring of a generic set of parameters may not capture key parameters specific to an application or an application tier. These key parameters may be known only to expert SMEs or developers.

Currently, service management of applications and the underlying infrastructure requires complex integration skills of SMEs and SME expertise spanning several vendor tools. As an enterprise moves into a hybrid multi-cloud environment, the integration requires more complex SME skills.

Using known application management techniques, an application design change introduced by a newer version of an application or a change to the business criticality of an application requires a reconfiguration of service management components. The reconfiguration of service management components requires an engagement or re-engagement of the aforementioned SMEs, which is costly and can delay a rollout.

Embodiments of the present invention address the unique challenges of conventional application management by providing application driven service management integration and configuration without mandating any changes to individual application tiers or the service management tools or applications. Embodiments disclosed herein significantly simplify the application deployment and management in service delivery, thereby creating savings in labor costs.

Embodiments of the present invention enable applications to drive their integration with enterprise service management tools by using a service registry (SR) and application programming interfaces (APIs) to register for specific service management functions.

Embodiments of the present invention configure a service registry to function as a directory of service management applications available across an enterprise.

Embodiments of the present invention configure a service registry such that the service registry is aware of the configuration requirements for various business criticality tiers and communicates the configuration requirements over an API during the configuration of the service registry.

Embodiments of the present invention provide (1) an integration layer that coordinates an interface between applications and SM tools and (2) API interfaces for SM tool integration.

Embodiments of the present invention simplifies the previously complex service management integrations by enabling application owners themselves to configure service management of their own multi-tier application without requiring the knowledge of service management tools and without depending on service management SMEs, thereby providing significant savings in labor costs and significantly faster turn-around time in workload provisioning.

Embodiments of the present invention enable (1) application owners to reconfigure the service integration options (e.g., backup policies and monitored parameters) without requiring knowledge of individual SM tools, and (2) service management tool owners to configure or reconfigure their tools or policies without any dependency on application owners.

The improvements described above can also be applied to benefit service management for containerized applications in a hybrid multi-cloud environment.

System for Configuring a Service Management Tool

FIG. 1 is a block diagram of a system 100 for configuring a service management tool, in accordance with embodiments of the present invention. System 100 includes a computer 102 which executes a software-based service management (SM) tool configuration system 104, which includes a service registry and integration layer 106 (also referred to herein as simply the integration layer). A service registry 108 and application programming interfaces (APIs) 110-1, 110-2, . . . , 110-N are included in service registry and integration layer 106, where N is an integer greater than or equal to one.

Applications 112, 114, and 116 are executed in computer 102 or one or more other computers (not shown) and are operationally coupled to service registry 108 and APIs 110-1, 110-2, . . . , 110-N. Although system 100 includes three applications 112, 114, and 116, other embodiments of the present invention include any number of one or more applications having access to integration layer 106. Applications 112, 114, and 116 can include, for example, on-premises applications, cloud-based applications, or otherwise externally hosted applications.

Application 114 has multiple tiers: application tier 118-1, . . . , application tier 118-M, where M is an integer greater than one. Although not shown in applications 112 or 116, any of the applications in system 100 can have multiple tiers. As one example, the tiers of application 114 may include a web tier, an application tier, and a database tier. Although not shown in FIG. 1, applications 112, 114, and 116 can be containerized applications.

Applications 112, 114, and 116 register for particular SM functions via APIs 110-1, 110-2, . . . 110-N that provide respective SM functions. In one embodiment, during an installation of an application (e.g., application 112) or during changes to the application, the application contacts service registry 108 to obtain a list of available SM tools that provide a particular SM function. By means of an explicit selection of one of the SM tools on the list obtained from service registry 108 (either by a manual or automatic selection), the application receives the explicit selection of the SM tool. In another embodiment, the application (e.g., application 112) provides required features or required parameters that a SM tool needs to meet (e.g., a minimum level of performance expected of a backup SM tool, the periodicity of the backup SM tool, etc.). Subsequently, service registry 108 selects a SM tool from a list of available SM tools, so that the selected SM tool meets the required features or required parameters.

For example, application 112 may register for SM function 1 (e.g., a backup function) via API 110-1, which is an API that provides an interface to SM tools 120, 122, and 124, which provide SM function 1. Similarly, API 110-2 provides an interface to SM tools 126 and 128 which provide SM function 2 (e.g., a monitoring function) and API 110-N provides an interface to SM tool 130 that provides SM function N (e.g., a patching management function). SM tools 120, 122, 124, 126, 128, . . . , 130 are executed in computer 102 or in one or more other computers (not shown) and are operationally coupled to service registry 108 and to APIs 110-1, 110-2, . . . , 110-N. A given API included in API 110-1, 110-2, . . . , API-N is coupled to a corresponding set of one or more SM tools included in SM tools 120, 122, 124, 126, 128, . . . , 130, where there are N sets of one or more SM tools. The sets of one or more SM tools in system 100 are coupled to respective APIs in integration layer 106, such that a given API for a given SM function is coupled to a corresponding set of one or more SM tools that provides the given SM function. For example, a first set of SM tools 120, 122, and 124 provide backup SM functions and are coupled to API 110-1, whereas a second set of SM tools 126 and 128 provide monitoring SM functions and are coupled to API 110-2. The aforementioned SM tools included in system 100 can include, for example, on-premises applications, software as a service (SaaS) applications, or externally hosted applications. Although not shown in FIG. 1, the SM tools 120, 122, 124, 126, 128, . . . , 130 can be containerized SM tools.

Applications 112, 114, and 116 drive their integration with SM tools 120, 122, 124, 126, 128, and 130 by using service registry 108 and APIs 110-1, 110-2, . . . , 110-N to register for specific SM functions (i.e., SM function 1, SM function 2, . . . , SM function N).

Although system 100 includes SM tools 120, 122, and 124 to provide SM function 1 via API 110-1, SM tools 126 and 128 to provide SM function 2 via API 110-2, and SM tool N to provide SM function N via API 110-N, other embodiments include a given SM function being provided by one or more SM tools (i.e., any number of SM tools) via a respective API included in integration layer 106.

Service registry 108 functions as a directory of SM tools available across an enterprise. SM tools of the enterprise are required to be registered with service registry 108. Service registry 108 is configured to have access to configuration requirements for various business criticality indicators (e.g., platinum, gold, silver, and bronze indicators) associated with applications, such as application 112, application 114, and application 116, or associated with tiers of applications, such as application tier 118-1, . . . , application tier 118-M of application 114, where M is an integer greater than one. For example, service registry 108 is aware of configuration requirements XYZ for a platinum business criticality associated with application 112, configuration requirements ABC for a gold business criticality associated with application tier 118-M, and configuration requirements DEF for a bronze business criticality associated with application tier 118-1. Alternatively, system 100 does not include a service registry as a stand-alone entity as depicted in FIG. 1, but rather the functionality of service registry 108 is integrated into the functionality of one or more service management tools, such as SM tools, 120, 122, 124, 126, 128, . . . , 130.

In one embodiment, service registry 108 receives a business criticality indicator of an application (or application tier). During a configuration of the application (i.e., during a deployment of the application), service registry 108 sends configuration requirements corresponding to the received business criticality indicator to the application via an API in integration layer 106.

In one embodiment, the topmost tier of an application (e.g., application tier 118-M in application 114) can discover or be configured with the configuration requirements of all lower tiers of the application (e.g., application tier 118-1 in application 114).

Integration layer 106 functions as a unifying interface between applications (e.g., application 112) and SM tools (e.g., SM tool 122). Integration layer 106 provides API 110-1, 110-2, . . . , 110-N for SM tool integration. A given API (e.g., API 110-1) for a given SM function is agnostic to the specific backup tools (e.g., SM tools 120, 122, and 124) that provide the given SM function.

The integration of applications 112, 114, and 116 (or application tiers 118-1, . . . , 118-M) with SM tools 120, 122, 124, 126, 128, . . . , 130 by using service registry 108 and APIs 110-1, 110-2, . . . , 110-N does not require changes to existing SM tools. The aforementioned integration does not require changes to applications 112, 114, and 116 (or to application tiers 118-1, . . . , 118-M), except that deployment modules of applications 112, 114, and 116 need to be integrated with service registry 108 and integration layer 106.

In one embodiment, manual registrations update the service registry 108 with registrations of SM tools, such as SM tools 120, 122, 124, 126, 128, . . . , 130. In another embodiment, service registry-aware SM tools automatically update service registry 108 with registrations of the aforementioned SM tools.

The functionality of the components shown in FIG. 1 is described in more detail in the discussion of FIG. 2, FIG. 3, FIG. 4, and FIG. 5 presented below.

Process for Configuring a Service Management Tool

Figure 2:
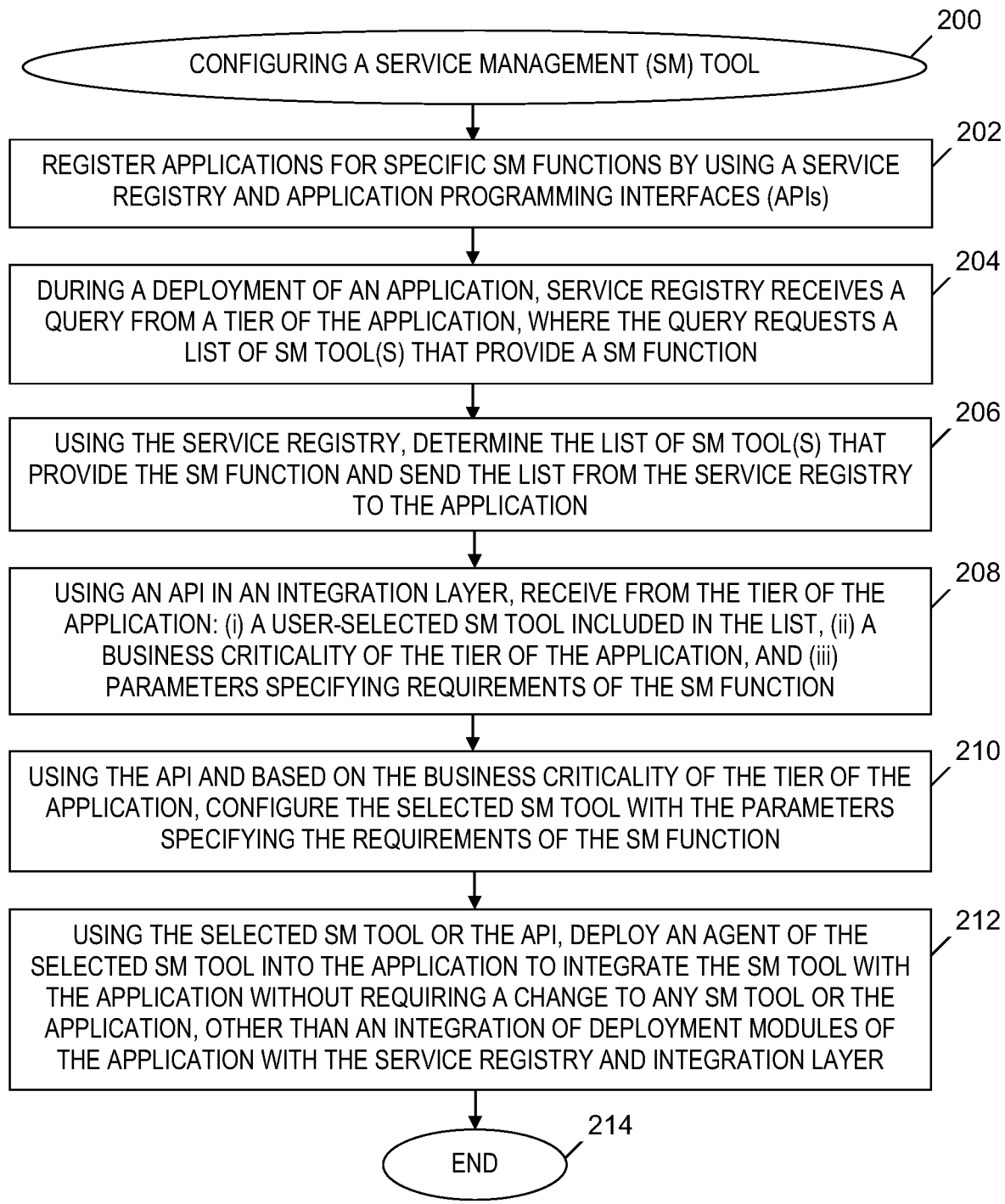
FIG. 2 is a flowchart of a process of configuring a service management tool, where the process is implemented in the system of FIG. 1, in accordance with embodiments of the present invention.

FIG. 2 is a flowchart of a process of configuring a service management tool, where the process is implemented in the system of FIG. 1, in accordance with embodiments of the present invention. The process of FIG. 2 starts at step 200. In step 202, SM tool configuration system 104 (see FIG. 1) registers applications for specific SM functions by using service registry 108 (see FIG. 1) and API 110-1, 110-2, . . . , 110-N (see FIG. 1). The specific ways that an application can be registered for a specific SM function are described above relative to FIG. 1.

In step 204, during a deployment of application 114, service registry 108 receives a query from application tier 118-M (see FIG. 1), where the query requests a list of SM tool(s) that provide a SM function.

In step 206, using service registry 108 (see FIG. 1), SM tool configuration system 104 (see FIG. 1) determines the list of SM tool(s) (i.e., SM tools 120, 122, and 124 in FIG. 1) that provide the SM function and sends the list of SM tool(s) from service registry 108 (see FIG. 1) to application 114 (see FIG. 1).

Prior to step 208, a user views the list of SM tool(s), selects a SM tool (i.e., SM tool 122 in FIG. 1) from the viewed list, and utilizes a computer 102 (see FIG. 1) or another computer (not shown) to send the selection of the SM tool to application 114 (see FIG. 1). In step 208, using API 110-1 (see FIG. 1) in integration layer 106 (see FIG. 1), SM tool configuration system 104 (see FIG. 1) receives from application tier 118-M (see FIG. 1): (i) the user-selected SM tool (i.e., SM tool 122) included in the list of SM tool(s), (ii) a business criticality indicator of application tier 118-M (see FIG. 1), and (iii) parameters specifying requirements of the SM function provided by the user-selected SM tool.

In step 210, using API 110-1 (see FIG. 1), and based on the business criticality indicator received in step 208, SM tool configuration system 104 (see FIG. 1) configures the user-selected SM tool with the parameters specifying the requirements of the SM function provided by the user-selected tool (i.e., the parameters received in step 208).

In step 212, the user-selected SM tool or SM tool configuration system 104 (see FIG. 1) using API 110-1 (see FIG. 1) deploys an agent of the user-selected SM tool into application 114 (see FIG. 1) to complete an integration of application 114 (see FIG. 1) with the user-selected SM tool, without requiring a change to SM tools 120, 122, 124, 126, 128, . . . , 130, and without requiring a change to application 114 (see FIG. 1), except for an integration of deployment modules of application 114 (see FIG. 1) with service registry 108 (see FIG. 1) and integration layer 106 (see FIG. 1).

In another embodiment, the deploying of the agent in step 212 is optional. For example, in a case in which the user-selected SM tool does not require an agent, the deploying of an agent in step 212 is omitted from the process of FIG. 2 and the completion of the integration of application 114 (see FIG. 1) with the user-selected SM tool is done after step 210 is performed.

After step 212, the process of FIG. 2 ends at step 214.

Embodiments of the present invention provide application driven configurations of SM tools that collectively provide any combination of SM functions and are not limited to the functions of backup and monitoring. Therefore, the discussions presented below relative to FIG. 3 and FIG. 4, which describe backup and monitoring functionalities, respectively, do not limit the present invention to any particular SM function. The discussions relative to FIG. 3 and FIG. 4 provide non-exhaustive examples of service management functions provided by SM tools 120, 122, 124, 126, 128, . . . , 130 (see FIG. 1).

Configuring a Backup Tool

Figure 3:
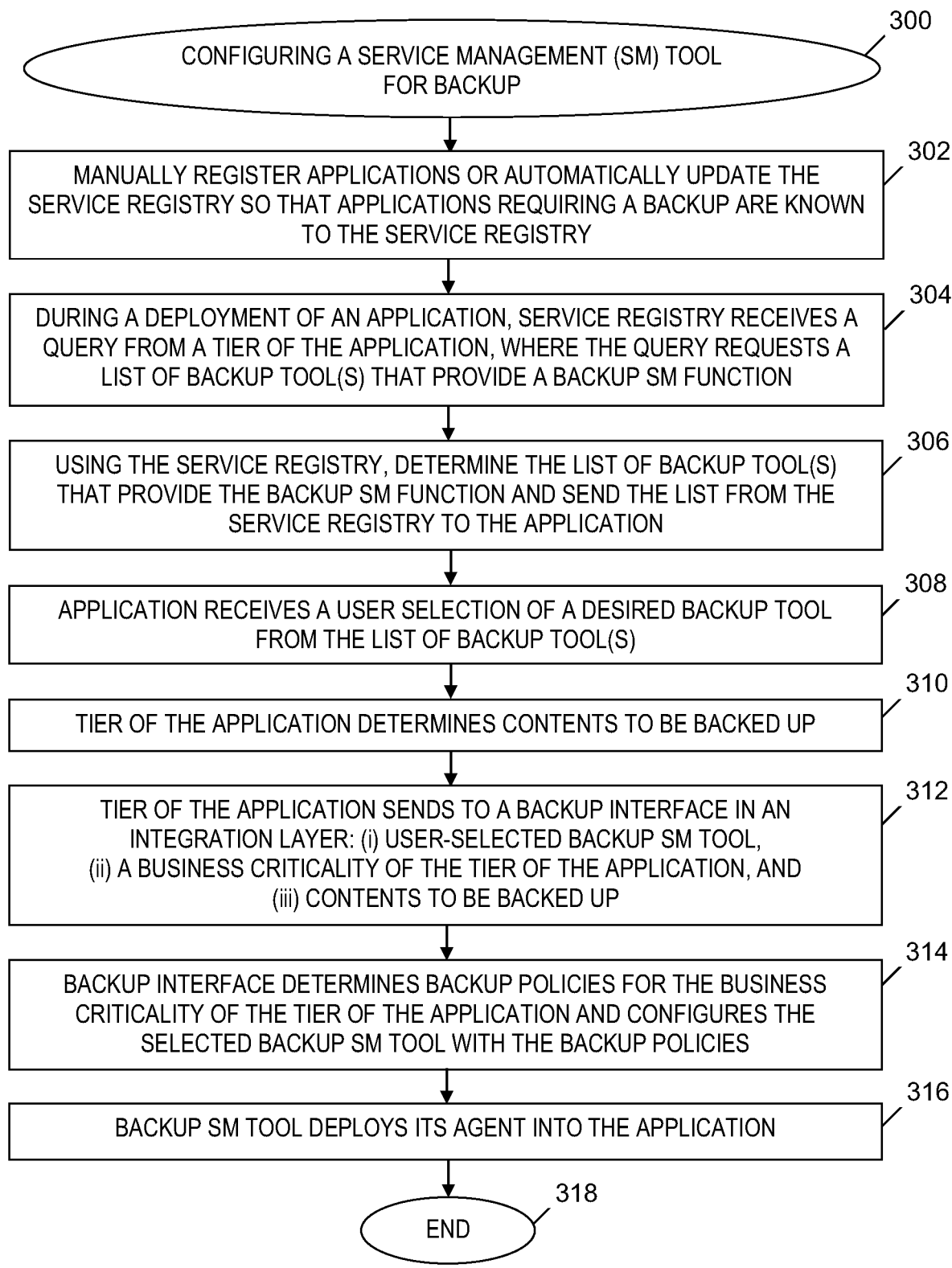
FIG. 3 is a flowchart of a process of configuring a backup service management tool, where the process is implemented in the system of FIG. 1, and where the backup service management tool is one non-exhaustive example of a service management tool in the system of FIG. 1, in accordance with embodiments of the present invention.
Figure 4:
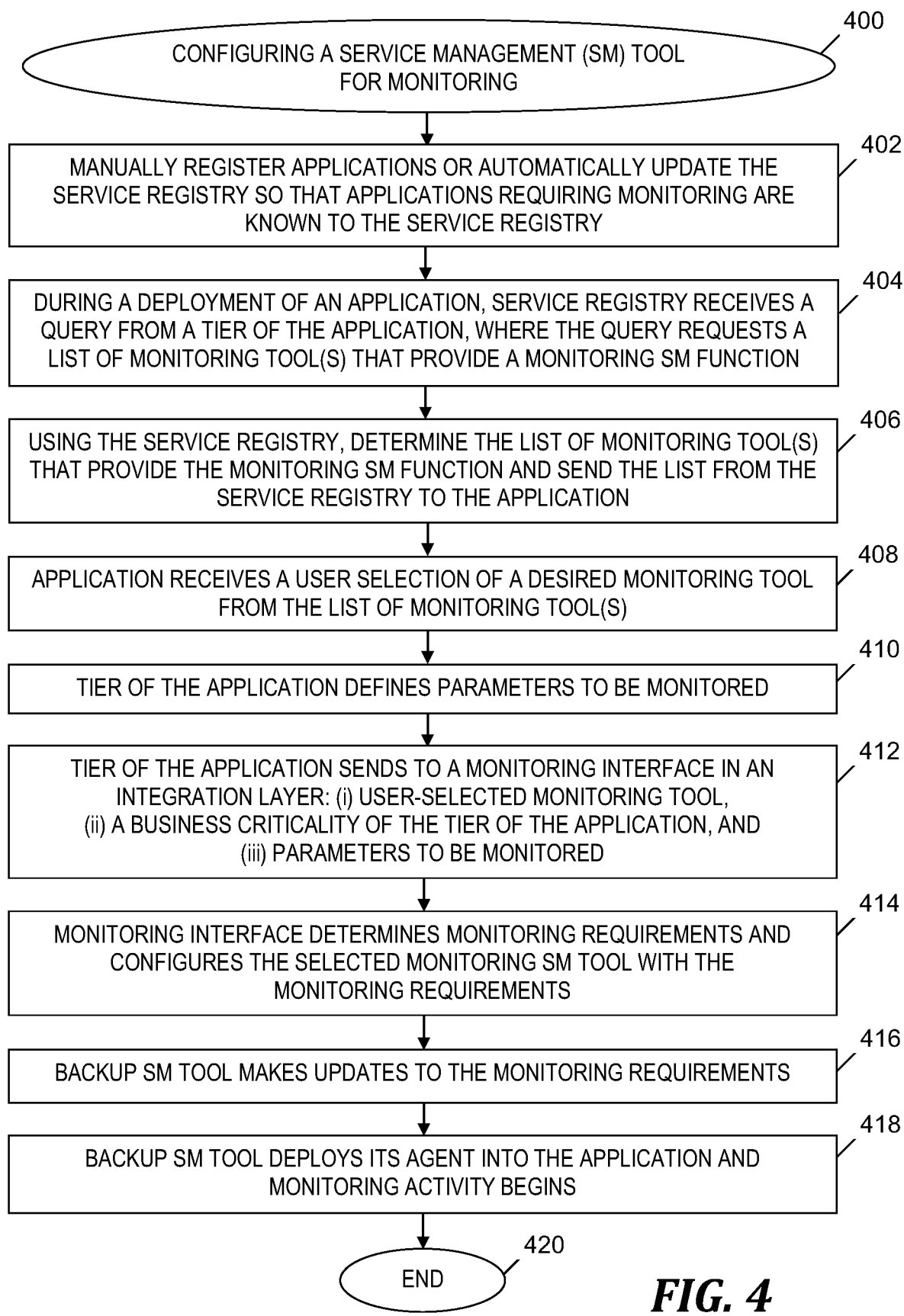
FIG. 4 is a flowchart of a process of configuring a monitoring service management tool, where the process is implemented in the system of FIG. 1, and where the monitoring service management tool is one non-exhaustive example of a service management tool in the system of FIG. 1, in accordance with embodiments of the present invention.

FIG. 3 is a flowchart of a process of configuring a backup service management tool, where the process is implemented in the system of FIG. 1, and where the backup service management tool is one non-exhaustive example of a service management tool in the system of FIG. 1, in accordance with embodiments of the present invention. The process of FIG. 3 starts at step 300. In step 302, service registry 108 (see FIG. 1) receives a manual registration of applications 112, 114, and 116 (see FIG. 1). Alternatively, applications that are aware of service registry 108 (see FIG. 1) automatically update service registry 108 (see FIG. 1) so that applications requiring a backup are known to service registry 108 (see FIG. 1). In one embodiment, step 202 (see FIG. 2) includes step 302.

In step 304, during a deployment of application 114 (see FIG. 1), service registry 108 (see FIG. 1) receives a query from application tier 118-M (see FIG. 1), where the query requests a list of backup SM tool(s) included in SM tools 120, 122, 124, 126, 128, . . . , 130 (see FIG. 1), and where the backup SM tool(s) provide a backup SM function to application 114 (see FIG. 1). In one embodiment, step 204 (see FIG. 2) includes step 304.

In step 306, service registry 108 (see FIG. 1) determines the list of backup SM tool(s) (e.g., SM tools 120, 122, and 124 in FIG. 1) that provide the backup SM function and sends the list of backup SM tool(s) to application 114 (see FIG. 1). In one embodiment, step 206 (see FIG. 2) includes step 306.

In step 308, application 114 (see FIG. 1) receives a user selection of a desired backup SM tool (e.g., SM tool 122 (see FIG. 1)) included in the list of backup SM tool(s) determined in step 306.

In step 310, application tier 118-M (see FIG. 1) determines the contents to be backed up by the user-selected backup SM tool. In one embodiment, steps 308 and 310 are performed subsequent to step 206 (see FIG. 2) and prior to step 208 (see FIG. 2).

In step 312, application tier 118-M (see FIG. 1) sends to a backup interface (i.e. API 110-1 (see FIG. 1)) in integration layer 106 (see FIG. 1): (i) an identifier of the user-selected backup SM tool, (ii) a business criticality indicator of application tier 118-M (see FIG. 1), and (iii) the contents to be backed up by the user-selected backup SM tool. In one embodiment, step 208 (see FIG. 2) includes step 312.

In step 314, the backup interface (i.e., API 110-1 (see FIG. 1)) determines backup policies for the business criticality indicator sent in step 312 and configures the user-selected backup SM tool with the backup policies. In one embodiment, step 210 (see FIG. 2) includes step 314.

In step 316, the user-selected backup SM tool deploys its software agent into application 114 (see FIG. 1). In one embodiment, step 212 includes step 316.

After step 316, the process of FIG. 3 ends at step 318.

Configuring a Monitoring Tool

FIG. 4 is a flowchart of a process of configuring a monitoring service management tool, where the process is implemented in the system of FIG. 1, and where the monitoring service management tool is one non-exhaustive example of a service management tool in the system of FIG. 1, in accordance with embodiments of the present invention. The process of FIG. 4 starts at step 400. In step 402, service registry 108 (see FIG. 1) receives a manual registration of applications 112, 114, and 116 (see FIG. 1). Alternatively, applications that are aware of service registry 108 (see FIG. 1) automatically update service registry 108 (see FIG. 1) so that applications requiring monitoring are known to service registry 108 (see FIG. 1). In one embodiment, step 202 (see FIG. 2) includes step 402.

In step 404, during a deployment of application 114 (see FIG. 1), service registry 108 (see FIG. 1) receives a query from application tier 118-M (see FIG. 1), where the query requests a list of monitoring SM tool(s) included in SM tools 120, 122, 124, 126, 128, . . . , 130 (see FIG. 1), and where the monitoring SM tool(s) provide monitoring SM function to application 114 (see FIG. 1). In one embodiment, step 204 (see FIG. 2) includes step 404.

In step 406, service registry 108 (see FIG. 1) determines the list of monitoring SM tool(s) (e.g., SM tools 126 and 128 in FIG. 1) that provide the monitoring SM function and sends the list of monitoring SM tool(s) to application 114 (see FIG. 1). In one embodiment, step 206 (see FIG. 2) includes step 406.

In step 408, application 114 (see FIG. 1) receives a user selection of a desired monitoring SM tool (e.g., SM tool 128 (see FIG. 1)) included in the list of monitoring SM tool(s) determined in step 406.

In step 410, application tier 118-M (see FIG. 1) determines the parameters to be monitored the user-selected monitoring SM tool. In one embodiment, steps 408 and 410 are performed subsequent to step 206 (see FIG. 2) and prior to step 208 (see FIG. 2).

In step 412, application tier 118-M (see FIG. 1) sends to a monitoring interface (e.g., API 110-2 (see FIG. 1)) in integration layer 106 (see FIG. 1): (i) an identifier of the user-selected monitoring SM tool, (ii) a business criticality indicator of application tier 118-M (see FIG. 1), and (iii) the parameters to be monitored by the user-selected monitoring SM tool. In one embodiment, step 208 (see FIG. 2) includes step 412.

In step 414, the monitoring interface (e.g., API 110-2 (see FIG. 1)) determines monitoring requirements for the business criticality indicator sent in step 412 and configures the user-selected monitoring SM tool with the monitoring requirements. In one embodiment, the monitoring requirements include identifiers of the parameters to be monitored and the frequency at which the parameters are to be monitored. In one embodiment, step 210 (see FIG. 2) includes step 414.

In step 416, the user-selected monitoring tool makes updates to the monitoring requirements. In one embodiment, step 416 is performed subsequent to step 210 (see FIG. 2) and prior to step 212 (see FIG. 2).

In step 418, the user-selected monitoring SM tool deploys its software agent into application 114 (see FIG. 1). In one embodiment, step 212 includes step 418.

After step 418, the process of FIG. 4 ends at step 420.

Computer System

Figure 5:
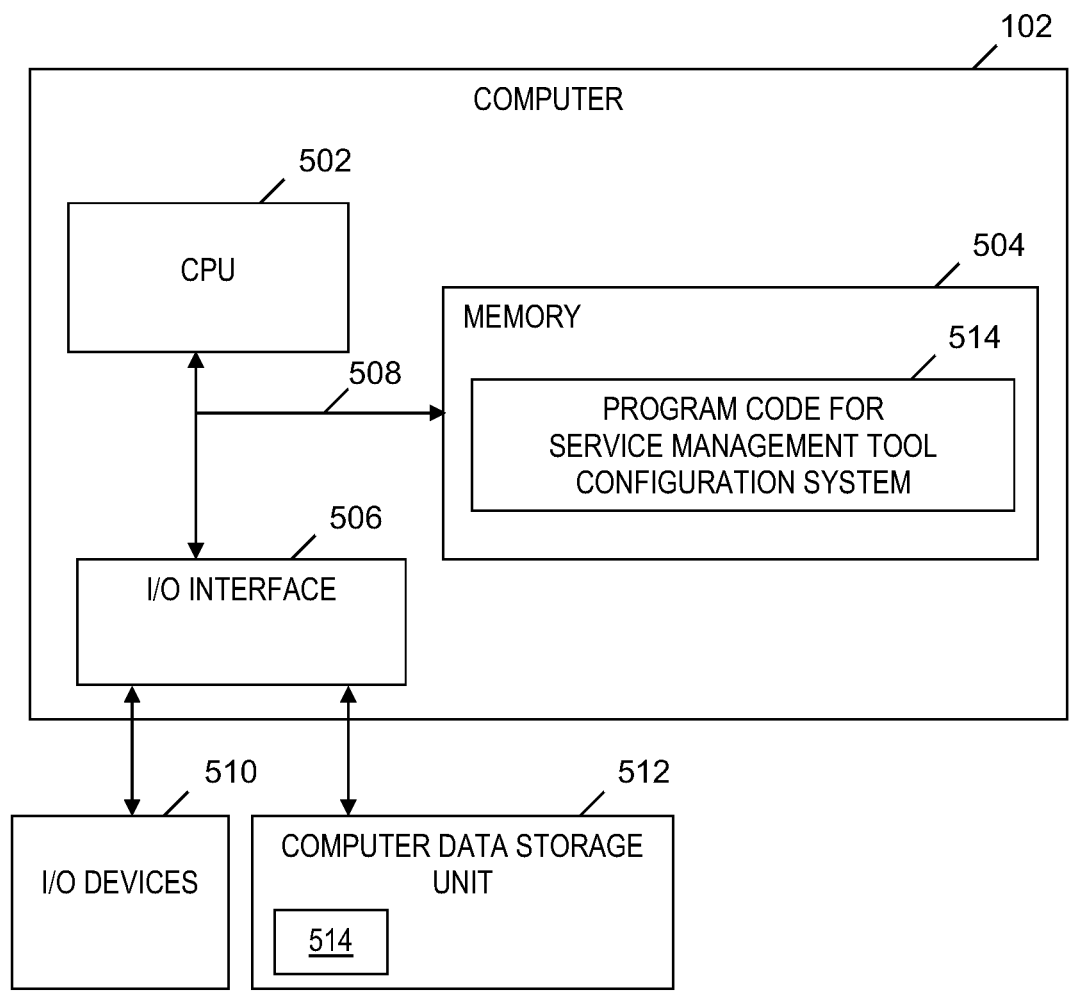
FIG. 5 is a block diagram of a computer included in the system of FIG. 1 and that implements the process of FIG. 2, in accordance with embodiments of the present invention.

FIG. 5 is a block diagram of a computer included in the system of FIG. 1 and that implements the process of FIG. 2, in accordance with embodiments of the present invention. Computer 102 is a computer system that generally includes a central processing unit (CPU) 502, a memory 504, an input/output (I/O) interface 506, and a bus 508. Further, computer 102 is coupled to I/O devices 510 and a computer data storage unit 512. CPU 502 performs computation and control functions of computer 102, including executing instructions included in program code 514 for SM tool configuration system 104 (see FIG. 1) to perform a method of configuring a SM tool, where the instructions are executed by CPU 502 via memory 504. CPU 502 may include a single processing unit or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk). Alternately, multiple computer data storage units replace the single computer data storage unit 512, where multiple computer readable storage media are included in the respective computer data storage units.

Memory 504 and/or storage unit 512 may store computer program code 514 that includes instructions that are executed by CPU 502 via memory 504 to configure a SM tool. Alternately, multiple computer data storage units that include multiple computer readable storage media collectively store computer program code 514. Although FIG. 5 depicts memory 504 as including program code, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to configuring a SM tool. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to configure a SM tool. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of configuring a SM tool.

While it is understood that program code 514 for configuring a SM tool may be deployed by manually loading directly in client, server and proxy computers (not shown) via loading one or more computer readable storage media (e.g., computer readable storage medium included in computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider can offer to create, maintain, support, etc. a process of configuring a SM tool. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., a computer readable storage medium included in computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of configuring a service management tool, the method comprising:

during a deployment of an application, receiving, by one or more processors, a query from a tier of the application for a list of service management (SM) tools that provide a SM function, the query being received by a service registry that provides a directory of SM tools that are available across an enterprise and a mapping of configuration requirements to respective tiers of applications;

in response to the query, determining, by the one or more processors and using the service registry, the list of SM tools that provide the SM function and sending the list of SM tools from the service registry to the application;

using an application programming interface (API) in an integration layer, receiving, by the one or more processors and from the tier of the application, (i) a user-selected SM tool included in the list of SM tools, (ii) a business criticality of the tier of the application, and (iii) parameters specifying the SM function, the API associating the parameters with the business criticality of the tier of the application; and using the API and based on the business criticality of the tier of the application, configuring, by the one or more processors, the selected SM tool with the parameters specifying the SM function.

2. The method of claim 1, further comprising in response to the configuring the selected SM tool with the parameters specifying the SM function, integrating, by the one or more processors, the selected SM tool with the application without requiring a change to the SM tools in the directory and without requiring a change to the application other than an integration of deployment modules of the application with the service registry and the integration layer.

3. The method of claim 1, further comprising:
configuring, by the one or more processors, the service registry with knowledge of configuration requirements of respective business criticalities of applications; and
sending, by the one or more processors, the configuration requirements to the application via the API.

4. The method of claim 1, wherein the query requests a list of backup tools that provide a backup function, wherein the determining the list of SM tools includes determining the list of backup tools, wherein the sending the list of SM tools includes sending the list of backup tools from the service registry to the application, wherein receiving the user-selected SM tool includes receiving a user-selected backup tool included in the list of backup tools, wherein receiving the parameters specifying the SM function includes receiving a backup policy that specifies contents to be backed up by the user-selected backup tool and that is associated with the business criticality of the tier of the application, and wherein configuring the selected SM tool includes configuring the user-selected backup tool with the backup policy.

5. The method of claim 1, wherein the query requests a list of monitoring tools that provide a monitoring function, wherein the determining the list of SM tools includes determining the list of monitoring tools, wherein the sending the list of SM tools includes sending the list of monitoring tools from the service registry to the application, wherein receiving the user-selected SM tool includes receiving a user-selected monitoring tool included in the list of monitoring tools, wherein receiving the parameters specifying the SM function includes receiving a monitoring policy that specifies parameters to be monitored and a frequency of monitoring and that is associated with the business criticality of the tier of the application, and wherein configuring the selected SM tool includes configuring the user-selected monitoring tool with the monitoring policy.

6. The method of claim 1, further comprising automatically updating the service registry with a registration of the SM tools included in the directory of SM tools by service registry-aware applications.

7. The method of claim 1, wherein the API is agnostic to the SM tools included in the list of SM tools.

8. The method of claim 1, further comprising:
providing at least one support service for at least one action selected from the group consisting of creating, integrating, hosting, maintaining, and deploying computer readable program code in a computer, the program code being executed by a processor of the computer to implement the receiving the query, the determining the list of SM tools that provide the SM function, the sending the list of SM tools from the service registry to the application, the receiving (i) the user-selected SM tool included in the list of SM tools, (ii) the business criticality of the tier of the application, and (iii) the parameters specifying the SM function, and the configuring the selected SM tool with the parameters specifying the SM function.

9. A computer program product for configuring a service management tool, the computer program product comprising:
one or more computer readable storage media having computer readable program code collectively stored on the one or more computer readable storage media, the computer readable program code being executed by a central processing unit (CPU) of a computer system to cause the computer system to perform a method comprising:

during a deployment of an application, the computer system receiving a query from a tier of the application for a list of service management (SM) tools that provide a SM function, the query being received by a service registry that provides a directory of SM tools that are available across an enterprise and a mapping of configuration requirements to respective tiers of applications;

in response to the query and using the service registry, the computer system determining the list of SM tools that provide the SM function and the computer system sending the list of SM tools from the service registry to the application;

using an application programming interface (API) in an integration layer, the computer system receiving from the tier of the application (i) a user-selected SM tool included in the list of SM tools, (ii) a business criticality of the tier of the application, and (iii) parameters specifying the SM function, the API associating the parameters with the business criticality of the tier of the application; and using the API and based on the business criticality of the tier of the application, the computer system configuring the selected SM tool with the parameters specifying the SM function.

10. The computer program product of claim 9, further comprising in response to the configuring the selected SM tool with the parameters specifying the SM function, the computer system integrating the selected SM tool with the application without requiring a change to the SM tools in the directory and without requiring a change to the application other than an integration of deployment modules of the application with the service registry and the integration layer.

11. The computer program product of claim 9, wherein the method further comprises:
the computer system configuring, by the one or more processors, the service registry with knowledge of configuration requirements of respective business criticalities of applications; and
the computer system sending, by the one or more processors, the configuration requirements to the application via the API.

12. The computer program product of claim 9, wherein the query requests a list of backup tools that provide a backup function, wherein the determining the list of SM tools includes determining the list of backup tools, wherein the sending the list of SM tools includes sending the list of backup tools from the service registry to the application, wherein receiving the user-selected SM tool includes receiving a user-selected backup tool included in the list of backup tools, wherein receiving the parameters specifying the SM function includes receiving a backup policy that specifies contents to be backed up by the user-selected backup tool and that is associated with the business criticality of the tier of the application, and wherein configuring the selected SM tool includes configuring the user-selected backup tool with the backup policy.

13. The computer program product of claim 9, wherein the query requests a list of monitoring tools that provide a monitoring function, wherein the determining the list of SM tools includes determining the list of monitoring tools, wherein the sending the list of SM tools includes sending the list of monitoring tools from the service registry to the application, wherein receiving the user-selected SM tool includes receiving a user-selected monitoring tool included in the list of monitoring tools, wherein receiving the parameters specifying the SM function includes receiving a monitoring policy that specifies parameters to be monitored and a frequency of monitoring and that is associated with the business criticality of the tier of the application, and wherein configuring the selected SM tool includes configuring the user-selected monitoring tool with the monitoring policy.

14. The computer program product of claim 9, further comprising the computer system automatically updating the service registry with a registration of the SM tools included in the directory of SM tools by service registry-aware applications.

15. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method of configuring a SM tool, the method comprising:
during a deployment of an application, the computer system receiving a query from a tier of the application for a list of service management (SM) tools that provide a SM function, the query being received by a service registry that provides a directory of SM tools that are available across an enterprise and a mapping of configuration requirements to respective tiers of applications;
in response to the query and using the service registry, the computer system determining the list of SM tools that provide the SM function and the computer system sending the list of SM tools from the service registry to the application;
using an application programming interface (API) in an integration layer, the computer system receiving from the tier of the application (i) a user-selected SM tool included in the list of SM tools, (ii) a business criticality of the tier of the application, and (iii) parameters specifying the SM function, the API associating the parameters with the business criticality of the tier of the application; and
using the API and based on the business criticality of the tier of the application, the computer system configuring the selected SM tool with the parameters specifying the SM function.

16. The computer system of claim 15, further comprising in response to the configuring the selected SM tool with the parameters specifying the SM function, the computer system integrating the selected SM tool with the application without requiring a change to the SM tools in the directory and without requiring a change to the application other than an integration of deployment modules of the application with the service registry and the integration layer.

17. The computer system of claim 15, wherein the method further comprises:
the computer system configuring, by the one or more processors, the service registry with knowledge of configuration requirements of respective business criticalities of applications; and
the computer system sending, by the one or more processors, the configuration requirements to the application via the API.

18. The computer system of claim 15, wherein the query requests a list of backup tools that provide a backup function, wherein the determining the list of SM tools includes determining the list of backup tools, wherein the sending the list of SM tools includes sending the list of backup tools from the service registry to the application, wherein receiving the user-selected SM tool includes receiving a user-selected backup tool included in the list of backup tools, wherein receiving the parameters specifying the SM function includes receiving a backup policy that specifies contents to be backed up by the user-selected backup tool and that is associated with the business criticality of the tier of the application, and wherein configuring the selected SM tool includes configuring the user-selected backup tool with the backup policy.

19. The computer system of claim 15, wherein the query requests a list of monitoring tools that provide a monitoring function, wherein the determining the list of SM tools includes determining the list of monitoring tools, wherein the sending the list of SM tools includes sending the list of monitoring tools from the service registry to the application, wherein receiving the user-selected SM tool includes receiving a user-selected monitoring tool included in the list of monitoring tools, wherein receiving the parameters specifying the SM function includes receiving a monitoring policy that specifies parameters to be monitored and a frequency of monitoring and that is associated with the business criticality of the tier of the application, and wherein configuring the selected SM tool includes configuring the user-selected monitoring tool with the monitoring policy.

20. The computer system of claim 15, further comprising the computer system automatically updating the service registry with a registration of the SM tools included in the directory of SM tools by service registry-aware applications.

\* \* \* \* \*